(12) United States Patent
Cencini et al.

(10) Patent No.: US 7,509,252 B2
(45) Date of Patent: Mar. 24, 2009

(54) FULL-TEXT INDEX MODULE CONSISTENCY CHECKING

(75) Inventors: Andrew B. Cencini, Seattle, WA (US); Mihai Tudor Popescu-Stanesti, Sammamish, WA (US); Nimish S. Khanolkar, Kirkland, WA (US); Jingwei Lu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 748 days.

(21) Appl. No.: 10/743,153

(22) Filed: Dec. 22, 2003

(65) Prior Publication Data
US 2005/0137856 A1 Jun. 23, 2005

(51) Int. Cl.
*G06F 17/21* (2006.01)
(52) U.S. Cl. .................................. 704/10; 704/7; 704/9
(58) Field of Classification Search ............... 704/1–10, 704/251–257, 270, 270.1; 707/3, 5
See application file for complete search history.

(56) References Cited

U.S. PATENT DOCUMENTS 6,675,159 B1 * 1/2004 Lin et al. ....................... 707/3
7,117,207 B1 * 10/2006 Kerschberg et al. ............ 707/5
7,185,001 B1 * 2/2007 Burdick et al. ................. 707/3

OTHER PUBLICATIONS

Alsmeyer, D., et al., "Collaborating in information space," *Online Information 98*, 22nd International Online Information Meeting, London, Dec. 8-10, 1998, 31-37.

Orenstein, R., "The fullness of full text," *Database Searcher*, Sep. 1989, 21-26.

* cited by examiner

*Primary Examiner*—Huyen X. Vo
(74) *Attorney, Agent, or Firm*—Woodcock Washburn LLP

(57) ABSTRACT

Consistency between the components used to generate and query a full-text index is determined and if a mismatch is detected, an error may be surfaced. A structure including information associated with each component used to build an index is programmatically compared with currently available components. The structure may be interrogated to enumerate the resources bound to a particular index. The enumeration of bound resources facilitates determination of what indexes (if any) must be regenerated for consistency as a result of a component upgrade or a move to another system.

23 Claims, 7 Drawing Sheets

List 228a: Com 1A, Com 2A, Com 3A
Register 226: Com 2A, Com 3A

List 228a: Com 1A, Com 2A, Com 3A
Register 226: Com 1B, Com 2A, Com 3A

| Beg Range | End Range | Compatibility |
|---|---|---|
| 1 | 1 | NO |
| 2 | 6 | YES |
| 7 | 7 | NO |
| 90 | 114 | NO |
| 117 | 126 | YES |
| 130 | 130 | YES |

700

FULL-TEXT INDEX MODULE CONSISTENCY CHECKING

FIELD OF THE INVENTION

The invention relates to full-text indexing systems and in particular to consistency checking of a full-text index based on components used to build and query that index.

BACKGROUND OF THE INVENTION

A full-text indexing system typically extracts content from unstructured text data (usually drawn from a relational database) and constructs one or more indexes or catalogs containing full-text indexes to facilitate efficient and rapid searching. Indexing refers to the overall process of processing text data and creating index entries derived from that text data.

A full-text search engine of a relational database returns results of queries against the indexes built on the unstructured text data. A full-text indexing and search engine thus may gather and filter data and then index the resulting words and properties from the documents into an index or catalog. It may also process queries for specified words and properties and then return references to the documents in the index or catalog that contains the specified items. One common use of a full-text indexing and search engine is a search engine for web sites.

A full-text indexing and search engine typically builds, maintains and queries full-text indexes. Indexing text is typically more complex than indexing values. For example, text being indexed is usually extracted from the database via a protocol component, and filtered by a filtering component to extract the text and values from the source. Text extracted by filters may be passed through wordbreakers to identify lexical constructs and tokenize on word boundaries. These word boundaries, in the English language, are typically whitespace or some form of punctuation. In other languages, such as Chinese, words or characters may be combined together or have other semantics that determine word boundaries so other means of tokenizing must be employed.

Querying full-text indexes is slightly different than executing standard relational queries for much the same reasons that indexing text is more complex than indexing values. To cite just one example, a user who runs a query on "daffodils" probably also would like to see documents that contain the word "daffodil". Hence, a stemmer is another common component of a full-text search engine. A stemmer is a component that determines the morphological root of a given inflected (or, sometimes, derived) word form. For example, in English, searching for the word "swim" is likely to also return documents with words like "swimming", "swam", "swum," and so on.

Query terms are passed to the full-text indexing and search engine, which transforms the query in much the same way as the index was built in order to be able to compare the query specification to the full-text index. The indexes are traversed, and typically a key and rank value to an underlying RDBMS record is returned.

When a version mismatch occurs between the components used to generate an index and the components used to query the index, unpredictable and undesirable results may occur. For example, changing a wordbreaker without rebuilding or resetting the index may result in retrieving different results today (based on a change in that wordbreaker's tokenization semantics) than that returned from the same search done on the same database yesterday. Typically, whenever a component is changed, for example in an upgrade or service pack, all the full-text indexes must be rebuilt in order to be sure that search requests will return correct results.

Rebuilding indexes can be a painful process for users, especially those users with very large databases. Rebuilding indexes can take days and while the rebuilding is taking place, full-text search capabilities are not typically accessible. At times, indexes are rebuilt that do not really need to be rebuilt. For example, suppose a new German wordbreaker is shipped in a service pack. Because of the inclusion of the wordbreaker, and because the vendor typically does not know what components the customer uses (and in some cases, the customer may not know the full scope of all components that are being used), the customer is likely to be told to rebuild his indexes, even if the customer has no German documents and has never used the German wordbreaker. It would be helpful if there were a way to minimize these and other problems associated with component mismatch in build and query components.

SUMMARY OF THE INVENTION

Consistency between the components used to generate and query a full-text index is determined and if a mismatch is detected, an error may be surfaced. A structure including information associated with each component used to build an index is programmatically compared with currently available components. The structure may be interrogated to enumerate the resources bound to a particular index. The enumeration of bound resources facilitates determination of what indexes (if any) must be regenerated as a result of a component upgrade or a move to another system.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

The version of the components used to build and query a full-text index are tracked and compared. A structure including information associated with each component used to build an index is compared with currently available components. If a mismatch is detected, an error may be returned. The structure may be interrogated to enumerate the resources bound to a particular index. The enumeration of bound resources allows the determination of what indexes (if any) must be regenerated as a result of a component upgrade or a move to another system.

Changes in or removal of dependent components such as external libraries or assemblies for instance, may result in a violation of integrity between how data is indexed and how it is later retrieved at query time. By programmatically tracking and versioning components used, and providing a method by which an index's dependent components can be interrogated, unintentional integrity violations may be prevented and unnecessary, time-consuming index regeneration (for indexes not impacted by a component upgrade) may be prevented.

Exemplary Computing Environment

Figure 1:
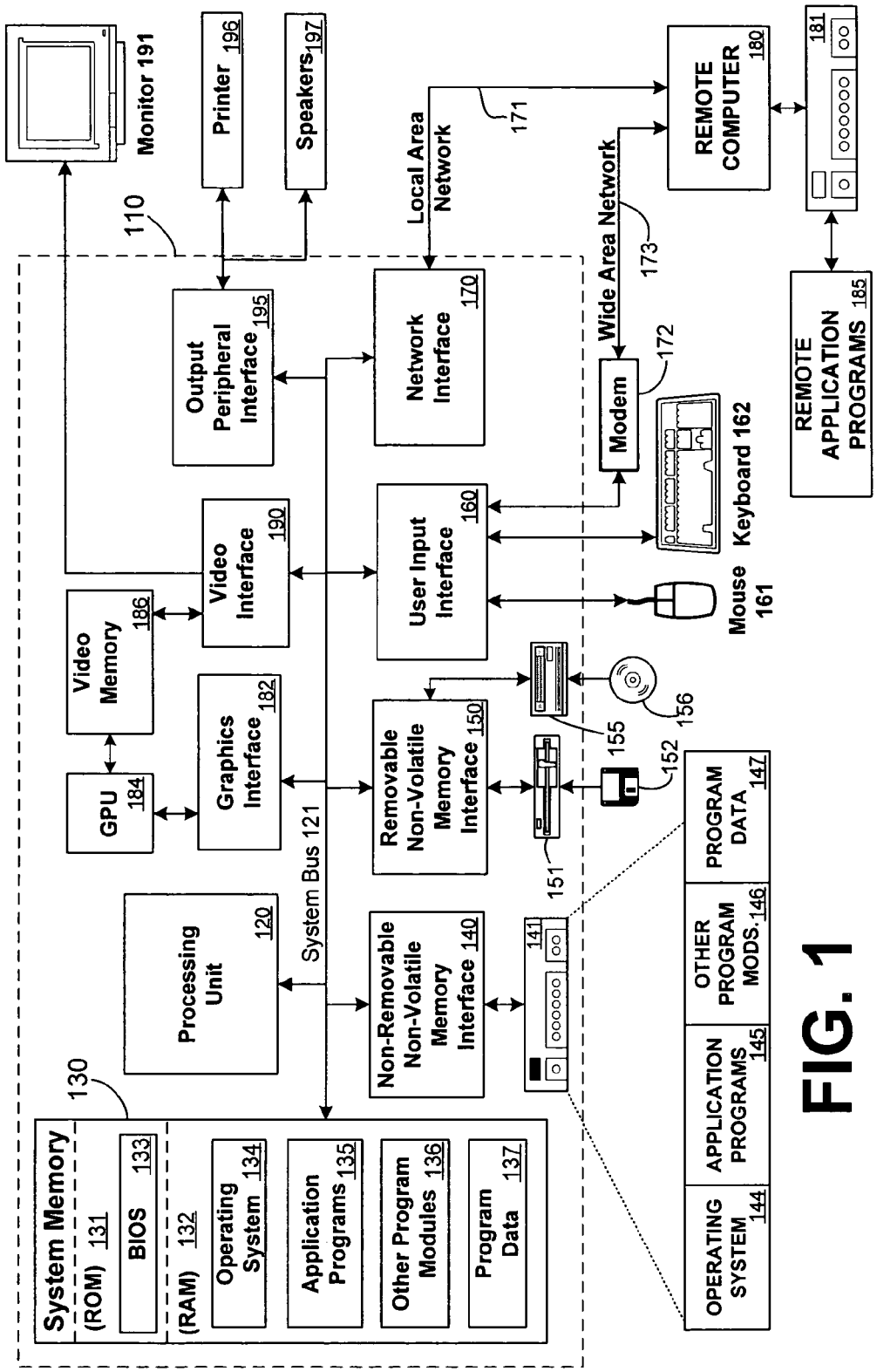
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM. Other removable/non-removable, volatile/nonvolatile computer storage media that can be used in the exemplary operating environment include, but are not limited to, magnetic tape cassettes, flash memory cards, digital versatile disks, digital video tape, solid state RAM, and solid state ROM. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Full-Text Index Module Consistency Checking

Figure 2:
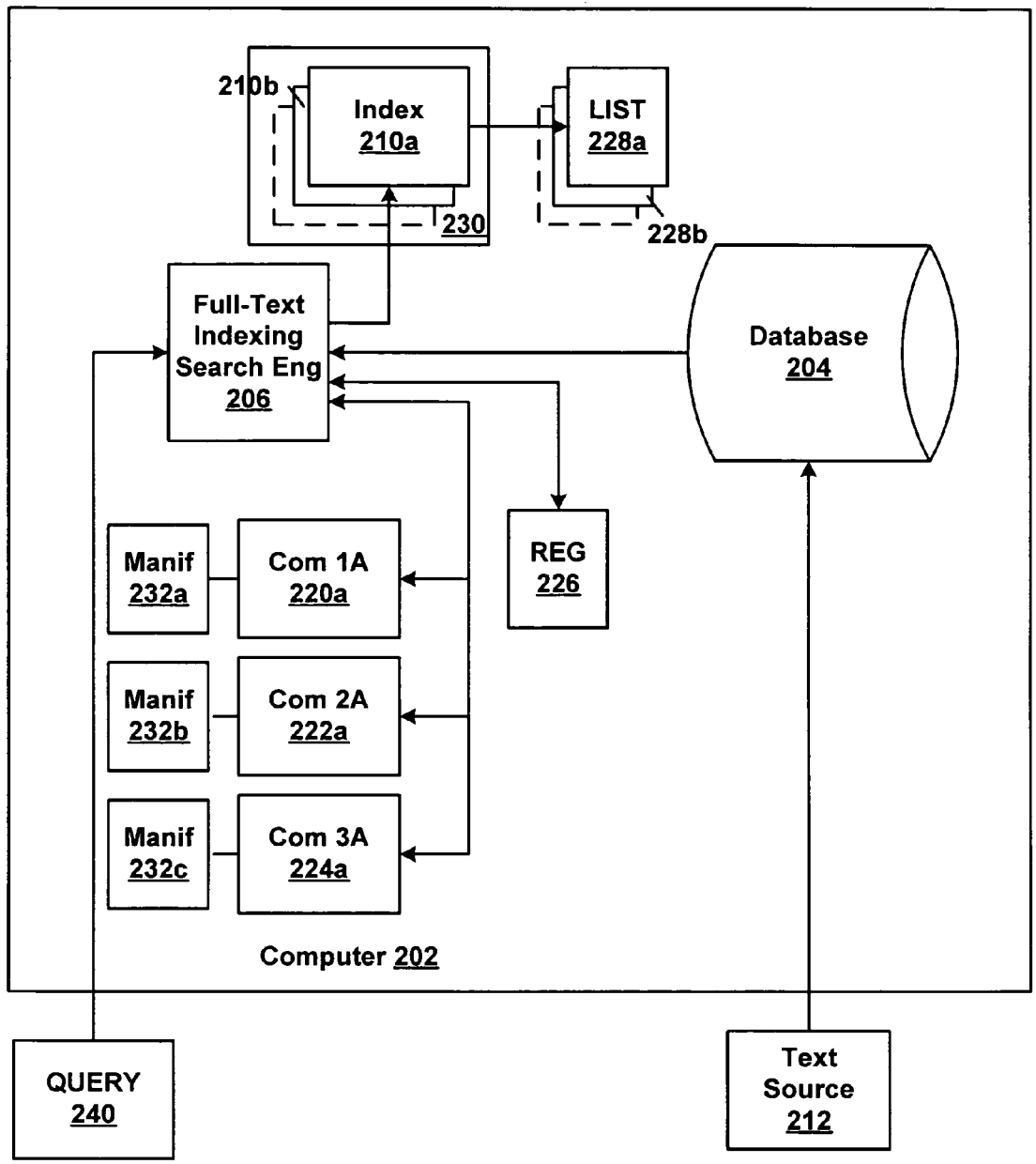
FIG. 2 illustrates an exemplary consistency checking system in accordance with one embodiment of the invention.

FIG. 2 illustrates an exemplary full-text indexing and search system in which aspects of the invention may be implemented. In FIG. 2 the full-text indexing and search system may reside on a computer 202. Computer 202 may be a computer such as computer 110 discussed with respect to FIG. 1. Computer 202 may include or be coupled to a RDBMS database 204, a full-text indexing and search engine 206, components represented by components 220a, 222a, 224a, etc. representing wordbreakers, protocol components, filters, stemmers, auto-categorizers and other modules, plug-ins or components that may be required to generate or query a full-text index. Computer 202 may also include or be coupled to one or more indexes (e.g., index 210a, 210b, etc.) and/or catalogs (e.g., catalog 230 containing indexes 210a, 210b, etc.) generated by the full-text indexing and search engine 206 from documents or other sources of text (e.g., text source 212 loaded into the RDBMS database 204). Indexes 210a, 210b, etc. may be stored in memory, on disk, or on another storage medium such as network storage and may be fragmented across multiple storage devices.

Referring again to FIG. 2, an exemplary system for consistency checking is illustrated. In FIG. 2 the full-text indexing and search engine 206 may receive unstructured or semi-structured text data from a database 204. The full-text indexing and search engine 206 may generate from the text data one or more indexes such as index 210a, 210b, etc. The full-text indexing and search engine 206 may also receive queries such as query 240 and return results by utilizing indexes 210a, 210b, etc.

The full-text indexing and search engine 206 in some embodiments is coupled to one or more components, such as but not limited to component 1A 220a, component 2A 222a and component 3A 224a. Components 1A 220a, 2A 222a and 3A 224a may represent filters, wordbreakers, protocol components, stemmers, auto-categorizers and other components (such as vendor-supplied or third-party plug-ins) used in the generation of indexes 210a, 210b, etc. from text data from database 204. Components 1A 220*a*, 2A 222*a* and 3A 224*a* may be components distributed with the full-text indexing and search engine or may be supplied separately (for example, by third-party vendors).

Database 204 may be a relational database such as an Oracle database, SQL Server database, DB2 database or other database associated with an RDBMS. Database 204 may comprise structured, unstructured and semi-structured data. Index 210*a*, 210*b*, etc. may in some embodiments be an inverted index that is generated from unstructured and semi-structured data (e.g., from text source 212 loaded into database 204) or directly from text sources such as text source 212. Index 210*a*, 210*b*, etc. may be stored within a database or external to a database.

Catalog 230 may comprise one or more indexes 210*a*, 210*b*, etc. Component lists 228*a*, 228*b*, etc. may comprise a structure that lists components used (such as components 1A 220*a*, 2A 222*a* and 3A 224*a*) to generate a particular index. Hence in some embodiments of the invention, one component list is generated for each index in catalog 230. Alternatively, one component list may be generated for all the indexes in a catalog. Component list 228*a*, 228*b*, etc. may include one or more of the following data elements: a comment (human-readable notes that are ignored by the system), a title line (e.g., for example for a filter component, the title line may be the word "Filter", for a wordbreaker the title line may be the word "Wordbreaker" followed by a space and the language identifier of the wordbreaker, another space and the effective language identifier of the wordbreaker, for a protocol component the words "Protocol Component", a space and the program identifier string of the protocol component and so on), the filename component of the full path, the full path to the file being loaded the filetime (creation time) of the file to be loaded, the filetime (last write time) of the file to be loaded, the version number of the component, the manufacturer name and the class identifier of the component.

Registry 226 includes a list of all the components that are currently available for execution on computer 202.

Figure 3:
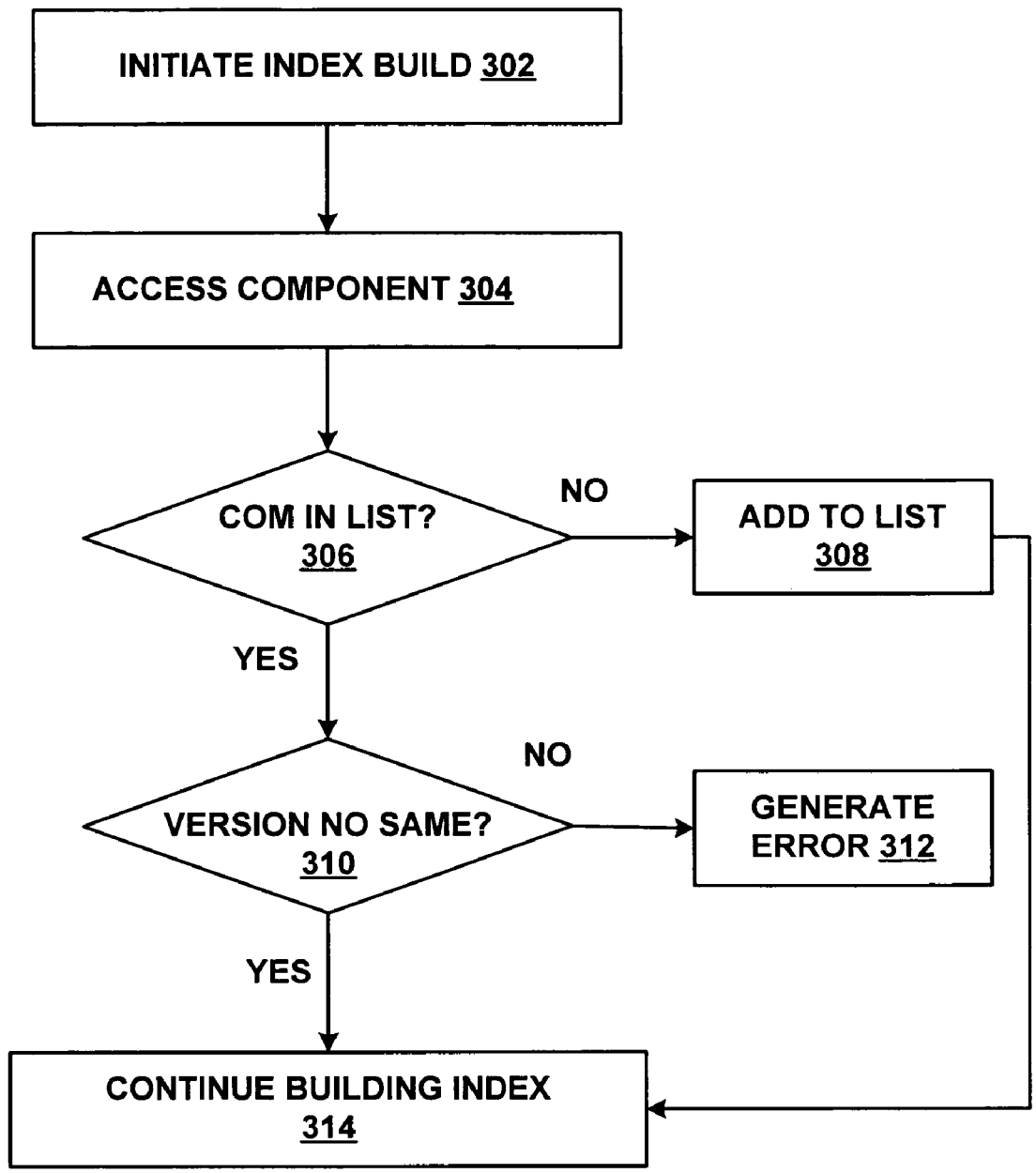
FIG. 3 is a flow diagram of an exemplary method for building an index in accordance with one embodiment of the invention.

FIG. 3 is a flow diagram of an exemplary method for building an index according to one embodiment of the invention. In FIG. 3, at step 302 an index build is initiated. At step 304, as the index is being built, components such as filters, wordbreakers, stemmers and protocol components may be required. As each component is accessed, the list 228*a* is referenced to determine if the component accessed is already in the list (step 306). At step 308 if the component is not already in the list, it is added to the list and index building continues at step 314. If the component is already in the list and the version number is not the same as the accessed version number (step 310), an error may be raised (312). If the version in the list is the same as the accessed version of the component, processing continues at step 314. This process is continued until the entire index is generated.

Suppose, for example, that to generate index 210*a*, components 1A 220*a*, 2A 222*a* and 3A 224*a* were used. Component list 228*a* in some embodiment will thus include entries for components 1A 220*a*, 2A 222*a* and 3A 224*a*.

When a catalog or index is mounted or moved (for example, during a detach/attach, or backup/restore scenario), its component list is compared to a list of available components on the server (the registry). A warning may be raised if there is a version mismatch or if a component is missing. Similarly, when a component is loaded, the component definition from the index component list is validated against the registry.

Figure 4:
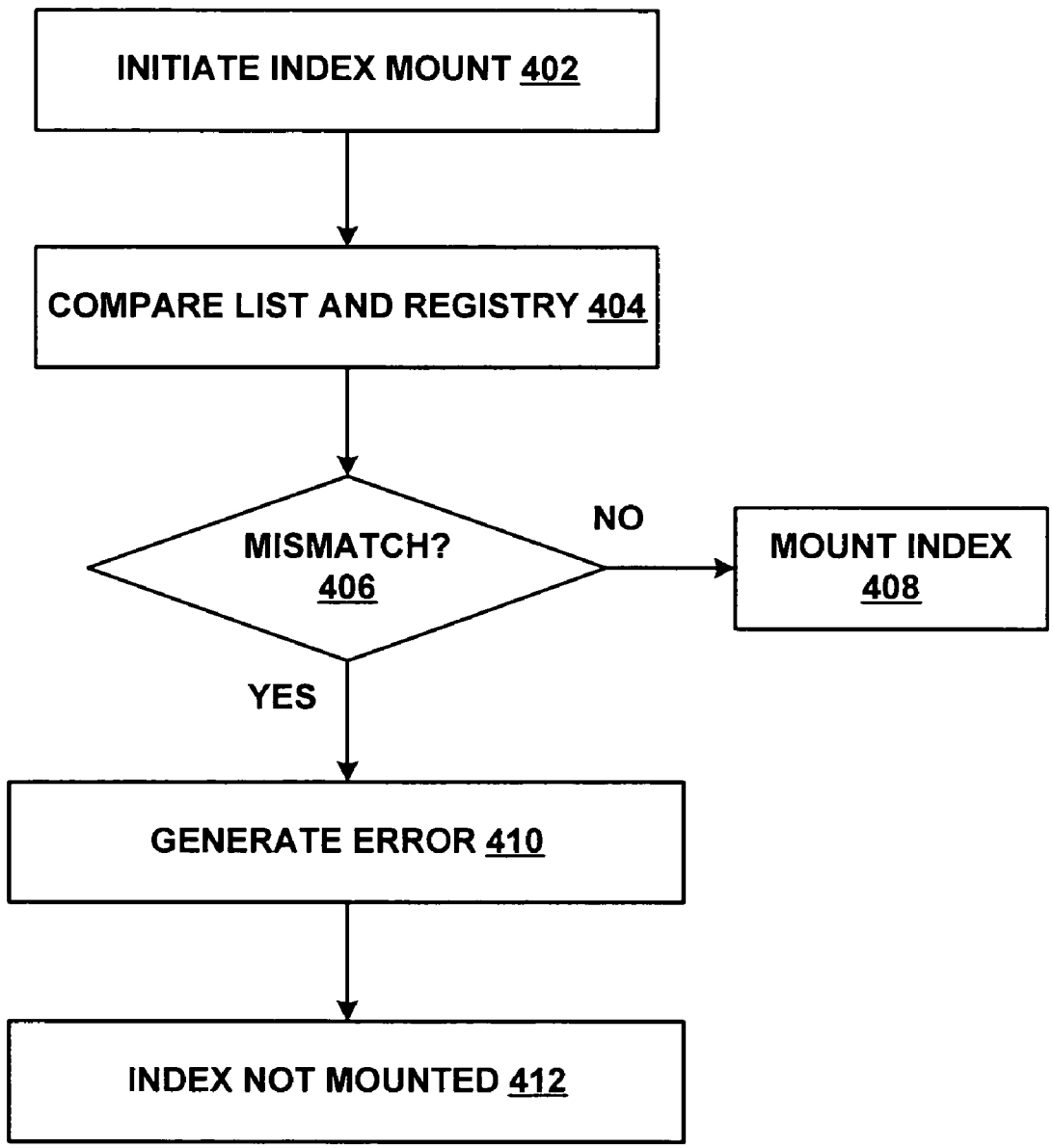
FIG. 4 is a flow diagram of an exemplary method for mounting an index in accordance with one embodiment of the invention.

For example, suppose now that catalog 230 comprising index 210*a* is to be mounted (that is, brought from the off-line state, making the index accessible). A catalog may be mounted because a query was received, a database is being attached to a server, or when a server is started up or under other circumstances. FIG. 4 is a flow diagram of an exemplary method for consistency checking in accordance with some embodiments of the invention. At step 402 the mounting of the catalog (e.g., catalog 230 comprising index 210*a* associated with component list 228*a*) is initiated. At step 404 the entries in component list 228*a* are compared with an enumeration of the registry 226 that includes a list of all currently available components. If the entries do not match (406), an error is returned (410) and the index may not be not mounted (412). If however, all components in list 228*a* match with entries in register 326, the catalog mounting will not be interrupted (408).

Figure 5:
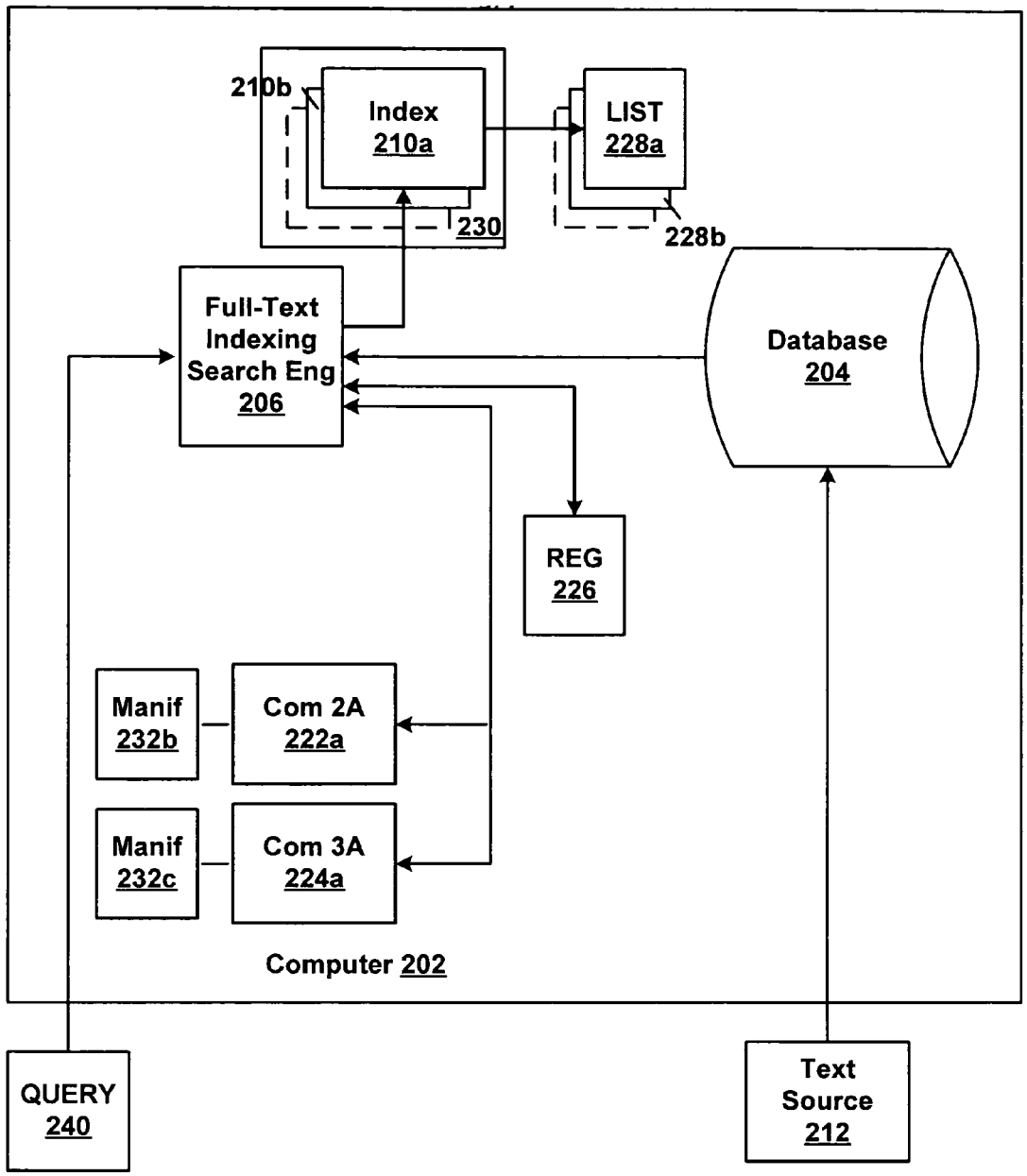
FIG. 5 illustrates an exemplary mismatch scenario according to as aspect of the invention.

For example, suppose that, after an index was built, a component was removed. This scenario may arise, for example, when a configuration change is made by an administrator to remove a particular component. Because that component was used to generate the index, it may also be necessary for future index generation consistency as well as for consistency at query time. Suppose for example, that after index 210*a* was built, component 1A 220*a* was removed, as illustrated in FIG. 5. A registry entry for component 1A 220*a* thus will not be found in register 226 and an error will be generated and the index will not be mounted.

Figure 6:
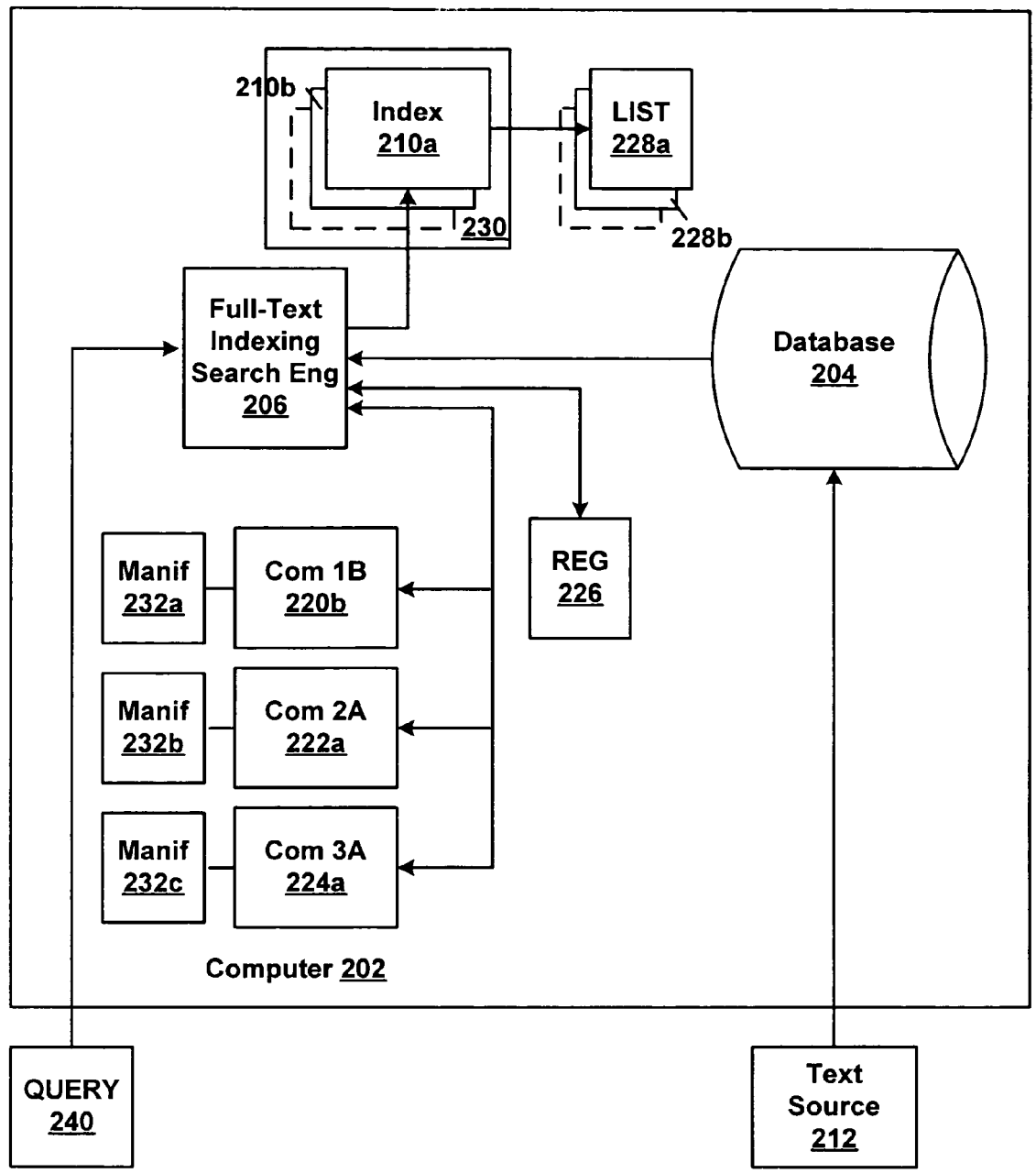
FIG. 6 illustrates a second exemplary mismatch scenario according to an aspect of the invention.

Suppose now that after the index 210*a* was generated, a new component version for component 1 was loaded. This scenario may arise, for example, if a service pack is installed where the service pack includes a bug fix in a component. Suppose, for example that component 1A 220*a* (version A) was replaced with component 1B 220*b* (version B) as shown in FIG. 6. At step 404 the entries in component list 228*a* are compared to the entries in registry 226. The entries in component list 228*a* include components 1A 220*a*, 2A 222*a* and 3A 224*a* while the entries in register 226 include components 1B 220*b*, 2A 222*a* and 3A 224*a*. In some embodiments, because the version numbers for component 1 do not match (the component list contains version A for component 1 and the registry contains version B for component 1), a mismatch is detected, an error is generated and the index is not mounted.

Suppose a full-text index is moved to a remote computer. The remote computer may have a different set of component libraries and assemblies which may result in consistency violations. The same process is followed as described with respect to FIG. 4 when mounting an index or loading a component onto a remote computer.

In some cases, different versions of a component are identified by differences in a program identifier, version number, date/time stamp, or other piece of unique information, or any combination thereof. Alternatively, a hash or checksum of the component versions may be taken and compared to determine if the versions are identical.

The component list may be used to gauge the impact of a move or component load. The component list may also be used in order to avoid rebuilding an existing index. For example, suppose two versions of an English wordbreaker are available. Suppose the first wordbreaker was used to generate one full-text index. By loading the second wordbreaker beside the first one (instead of replacing the first wordbreaker with the second wordbreaker), the second wordbreaker may be used to create a new index and the first wordbreaker may remain bound to the first index via the component list.

In some embodiments of the invention, as illustrated in FIG. 2, a manifest file such as manifest file 232*a*, 232*b*, 232*c* etc., is supplied with a component such as component 1A 220*a*, 2A 222*a* and 3A 224*a*, etc. A manifest file provides a mechanism by which the version-to-version consistency requirements described above with respect to some embodiments of the invention can be relaxed. The manifest may include a compatibility map of all versions of its associated component. For example, in some embodiments of the invention, if the component is accompanied by a manifest file, versions that are compatible with each other (thus not requiring a rebuild of the index), can be specified. If no manifest file is present for a component, and the catalog version (entered in the component list 228a, etc.) differs from the system version (enumerated in the register 226), a consistency warning may be raised. If a manifest file is present but there is no mapping between the catalog version and the system version, a consistency warning may be raised.

The manifest file may also provide a history for the component with which it is associated. For example, each time a new version of the component is created, an entry may be made in the component's manifest file to explicitly map the compatibility or incompatibility of the new version to previous versions.

In some embodiments of the invention, entries in the manifest file may include one or more of the following data elements:

the beginning of the range (the first version for which the rule is effective)

the end of the range (the last version for which the rule is effective)

compatibility of the new version with the previous version or range of versions.

Figure 7:
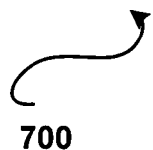
FIG. 7 illustrates an exemplary manifest data structure in accordance with one embodiment of the invention.

For example, referring now to the exemplary table 700 illustrated in FIG. 7, suppose version 1 is the first release of component X. In some embodiments, a range of a single version may be defined (in the example, the beginning of the range and the end of the range are 1). Compatibility is set to NO to indicate that any version before version 1 is not compatible with version 1. A second exemplary range may be defined as versions 2 to 6. This range is marked as compatible with the first range (1 to 1). For example, perhaps the component was recompiled but not changed in any way that would affect the function of the component with respect to building or querying the index. A third range may be defined as version 7 (7-7). This range is marked incompatible with the previous range. For example, perhaps the component was changed in the way that it handles some condition, representing a functional change to the component and the index generated by the component. Hence version 7 is marked as incompatible with previous releases. The next entry in the table is for versions 90-114, hence compatibility for versions between 7 and 90 are unknown. In some embodiments, versions within the range of 8-89 are thus treated as incompatible with previous versions. Version 90 may correspond to a completely new component version shipped with, for example, a new release of the product including component X. Versions 90-114 may span a range of versions for which there are no functional changes to component X so anything within the range is compatible.

To relate the manifest table to the previous examples, suppose for example, that the component list 238a includes version 99 for component X and the register 236 includes the entry 114. By checking the manifest, it can be determined that there are no compatibility issues between version 99 and version 114 and therefore no error would be generated and the index would be mounted or the index would continue to be built.

Versions 117-126 in the example are specified as compatible with the previous range (90-114) and version 130 is compatible with the previous range (117-126). Hence version 130 is compatible with versions 90-114, 117-126 and with version 130. Therefore if the version in the list and the version in the registry is in any of these ranges, no compatibility issues exist but if one of the entries is not in one of these ranges, an error will be generated.

It will be understood that the above example is presented for ease of understanding and is not to be construed as limiting. The manifest is not limited to a table structure, nor to the data elements specified, or to a particular number of version ranges or particular indicators for compatibility and incompatibility. Any suitable mechanism for indicating compatibility between versions is contemplated.

In some embodiments of the invention, the manifest may be an XML file, or alternatively the manifest file may be a plain text file. For example, an exemplary schema for a suitable XML file may be as listed below:

```
<schema xmlns="x-schema:ftmanifest.xml">
    <ftComponent guid="guid">
        <versionRange>
            <beginRange value="string" />
            <endRange value ="string" />
            <compatibility value=:{y|n} />
        </versionRange>
    </ftComponent>
</schema>
```

An exemplary plain text manifest file may comprise for example, one entry per line with the format (string)begin_version(string)end_version(char)comptibility[y|n] #comment.

It will be apparent that the above manifest files are exemplary only and the invention as contemplated is not limited to these or any other file structures. Any suitable file structure is contemplated.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. For example, although presented within the context of full-text indexing and search systems and methods, the systems and methods of the above described invention may profitably be applied to any problem space in which consistency of versions of functional indexes built using modular components such as libraries or assemblies is required or useful. Therefore, the present invention should not be limited to any single embodiment, but rather should be construed in breadth and scope in accordance with the appended claims.

What is claimed is:

1. A computer-implemented method for integrity checking of full-text indexes via executable software component consistency checking, comprising:

generating by a processor a list of executable software components used to build a full-text index, the list comprising at least one component list entry, the at least one component list entry comprising a version of an executable software component used to build the full-text index;

comparing the at least one component list entry with a registry of executable software components, the registry comprising at least one registry entry, the at least one registry entry comprising a version of an executable software component available for execution; and if it is determined based on said comparing that the version of the executable software component used to build the full-text index and the version of the executable software component available for execution do not match, generating an error and reporting the error to a user.

2. The method of claim 1 further comprising aborting mounting of the full-text index.

3. The method of claim 1 wherein the executable software component used to build a full-text index comprises a wordbreaker.

4. The method of claim 1 wherein the executable software component used to build a full-text index comprises a protocol component.

5. The method of claim 1 wherein the executable software component used to build a full-text index comprises a stemmer.

6. The method of claim 1 wherein the executable software component used to build a full-text index comprises a filter.

7. The method of claim 1 wherein the executable software component used to build a full-text index comprises a plug-in.

8. The method of claim 1 wherein the executable software component used to build a full-text index comprises an auto-categorizer.

9. The method of claim 1 farther comprising maintaining a list of compatible versions of the at least one component list entry, such that in response to determining that the at least one registry entry is included within the list of compatible versions, an error is not generated.

10. A computer-implemented method for building a full-text index comprising:

generating by a processor a list associated with a full-text index, the list comprising at least one executable software component and a version of the at least one executable software component, the at least one executable software component used to build the full-text index;

determining based on the list whether the version of said at least one executable software component in said list is available; and if the version of said at least one executable software component in said list is not available, then re-generating the fall-text index using an available version of said at least one executable software component.

11. The method of claim 10, wherein the list comprises a filename component of a full path for the at least one executable software component.

12. The method of claim 10, wherein the list comprises a full path of the at least one executable software component.

13. The method of claim 10, wherein the list comprises a creation time of the full-text index.

14. The method of claim 10, wherein the list comprises a last write time of the full-text index.

15. The method of claim 10, wherein the list comprises a manufacturer name.

16. The method of claim 10, wherein the list comprises a class id of the at least one executable software component.

17. The method of claim 10, wherein the version of the at least one executable software component is associated with a list of compatible versions.

18. The method of claim 17, wherein in response to determining that the version of the at least one executable software component in the list and a version of the at least one executable software component in a registry of component versions available for execution are incompatible, an error is generated.

19. A computer system for checking the consistency of executable software components used to build a full-text index and components used to query the full-text index, comprising:

a memory that stores:
a first list of executable software components used to build the full-text index, the first list comprising at least one build component and a version associated with the at least one build component; and
a second list of components used to query the full-text index, the second list comprising at least one query component and a version associated with the at least one query component; and a processor on which is executing a full-text indexing and search engine that generates the first list and the second list and that accesses the first list and the second list to check the consistency of executable software components used to build the full-text index and components used to query the full-text index.

20. The system of claim 19, further comprising a list of compatible executable software component versions.

21. The system of claim 19, wherein the at least one build component is a wordbreaker, filter, stemmer, protocol component, auto-categorizer or plug-in.

22. The system of claim 19, wherein the at least one query component is a wordbreaker or stemmer.

23. A computer-readable storage medium comprising computer-executable instructions for:

generating a list of executable software components used to build a full-text index, the list comprising at least one entry, the at least one entry comprising a version of an executable software component; and comparing the at least one entry in the list of executable software components with entries in a registry of versions of executable software components available for execution; and if it is determined based on said comparing that the version of the executable software component used to build the full-text index and a version of the executable software component available for execution do not match, generating an error and reporting the error to a user.

* * * * *

UNITED STATES PATENT AND TRADEMARK OFFICE
CERTIFICATE OF CORRECTION

| | | |
|---|---|---|
| PATENT NO. | : 7,509,252 B2 | Page 1 of 1 |
| APPLICATION NO. | : 10/743153 | |
| DATED | : March 24, 2009 | |
| INVENTOR(S) | : Andrew B. Cencini et al. | |

It is certified that error appears in the above-identified patent and that said Letters Patent is hereby corrected as shown below:

In the Claims:

In column 11, line 29, in Claim 2, delete "claim 1" and insert -- claim 1, --, therefor.

In column 11, line 31, in Claim 3, delete "claim 1" and insert -- claim 1, --, therefor.

In column 11, line 34, in Claim 4, delete "claim 1" and insert -- claim 1, --, therefor.

In column 11, line 37, in Claim 5, delete "claim 1" and insert -- claim 1, --, therefor.

In column 11, line 40, in Claim 6, delete "claim 1" and insert -- claim 1, --, therefor.

In column 11, line 42, in Claim 7, delete "claim 1" and insert -- claim 1, --, therefor.

In column 11, line 44, in Claim 8, delete "claim 1" and insert -- claim 1, -- therefor.

In column 11, line 47, in Claim 9, delete "claim 1 farther" and insert -- claim 1, further --, therefor.

In column 11, line 64, in Claim 10, delete "fall-text" and insert -- full-text --, therefor.

Signed and Sealed this
Nineteenth Day of April, 2011

David J. Kappos
*Director of the United States Patent and Trademark Office*